(12) United States Patent
Winterot et al.

(10) Patent No.: US 6,504,656 B1
(45) Date of Patent: Jan. 7, 2003

(54) VARIABLE LENS

(75) Inventors: Johannes Winterot, Jena (DE); Peter Huettel, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 157 days.

(21) Appl. No.: 09/831,471

(22) PCT Filed: Aug. 30, 2000

(86) PCT No.: PCT/EP00/08436
§ 371 (c)(1),
(2), (4) Date: Jul. 13, 2001

(87) PCT Pub. No.: WO01/18584
PCT Pub. Date: Mar. 15, 2001

(30) Foreign Application Priority Data

Sep. 9, 1999 (DE) .......................................... 199 43 015

(51) Int. Cl.$^7$ ............................................... G02B 15/14
(52) U.S. Cl. ...................................... 359/690; 359/689
(58) Field of Search .................................. 359/689, 690

(56) References Cited

U.S. PATENT DOCUMENTS

| | | |
|---|---|---|
| 4,312,572 A | 1/1982 | Yamashita et al. |
| 4,348,082 A | 9/1982 | Ogawa |
| 4,861,145 A | 8/1989 | Kikuchi |
| 5,144,488 A | 9/1992 | Endo et al. |
| 5,699,198 A | 12/1997 | Inadome et al. |

FOREIGN PATENT DOCUMENTS

| | | | |
|---|---|---|---|
| DE | 30 18 481 | | 11/1980 |
| DE | 43 15 630 | | 11/1994 |
| GB | 1201781 | * | 10/1967 |
| GB | 1 201 781 | | 8/1970 |
| GB | 2 051 400 | | 1/1981 |

OTHER PUBLICATIONS

Journal of the Optical Society if America, vol. 44, No. 9, Sep. 1954, (pp. 684–691) "The Basic Theory of Varifocal Lenses with Linear Movement and Optical Compensation" F.G. Back and H. Lowen.

Journal of the Optical Society if America, vol. 48 No. 39, Mar. 1958 (pp. 149–153) "Generalized Theory of Zoomar Systems" F.G. Back and H. Lowen.

Verlag Technik, Berlin 1958, pp. 66ff "The Optical System of the Microscope".

* cited by examiner

Primary Examiner—Hung Xuan Dang
(74) Attorney, Agent, or Firm—Reed Smith LLP

(57) ABSTRACT

A variable objective is disclosed with finite transmission length L from the object plane 0 to the image plane 0', comprising three axially displaceable lens groups, wherein, successively in the imaging direction, a first lens group has positive refractive power, a second lens group has negative refractive power and the third lens group has positive refractive power. In a variable objective of the type mentioned above, the first lens group and third lens group are displaceable jointly while maintaining the same relative distance L2, wherein the distance $L1+D1_{actual}$ measured between the first lens group and the object plane 0 changes by the amount $D1_{actual}=0 \ldots D1_{max}$, while the distance $D2_{actual}$ between the second lens group and the object plane 0 is subjected to a positively-guided nonlinear change. The movement of the second lens group is preferably carried out approximately according to the following relationship:

$$D2_{actual}=D2_{average}+C1*\cos(C2*D1_{actual}+C3),$$

where C1, C2 and C3 are command variables characterizing the nonlinearity. A mechanical compensation of the focus position is achieved in this way.

18 Claims, 3 Drawing Sheets

VARIABLE LENS

BACKGROUND OF THE INVENTION a) Field of the Invention

The invention is directed to a variable objective with finite transmission length L from the object plane 0 to the image plane 0', comprising three axially displaceable lens groups, wherein, successively in the imaging direction, a first lens group has positive refractive power, a second lens group has negative refractive power and the third lens group has positive refractive power.

b) Description of the Related Art

Depending on the imaging task, systems of variable magnification are differentiated into those for finite transmission length, those with infinite distance on one side and those with infinite distance on both sides. Systems of this kind differ from one another with respect to their laws of dynamics and the aimed for parameters as an expression of the magnification and change in magnification. For finite transmission length, the ratio of image height to object height, generally referred to as image scale, is used as magnification. For systems with infinite front focal distance, the focal length is normally indicated. Systems with finite front focal distance and infinite image position use the reciprocal focal length. For afocal systems, as they are called, which border on infinity on both sides, the ratio of the tangential values of the image-side field angle and object-side field angle are indicated.

The basic construction of optical systems with variable magnification for different imaging or scale ratios is known from technical literature and from patent literature.

Objective lenses of the type mentioned above, also known as variable objective systems, must perform two tasks: first, they must change the magnification and, second, they must compensate for focus variations and always image the object sharply on the image position.

The invention is directed to systems with constant finite transmission length. For systems of this kind, at least two axially displaceable lenses or lens groups are always necessary, wherein the magnification is changed with the axial displacement of one lens group, and the second lens group must be displaced simultaneously in such a way that the focusing of the image is maintained with the image position remaining the same. As a result, the displacing movements must be coupled with one another.

Imaging systems of this kind can be used monochromatically or in a very narrow spectral range. For this purpose, it may be sufficient to construct the individual members from one optical medium. When broad spectral regions must be taken into account, it is advantageous to construct the individual optical members achromatically. In the simplest case, a group is formed of two lenses with different dispersions. The term "lens group" will also be used synonymously with lens in the following. If a lens is overtaxed, its optical action can be split up between several elements subject to the same dynamics. This splitting up is likewise included within the scope of the invention.

For variable lens systems with finite transmission length, knowledge of the refractive power distribution and the dynamics are sufficient to enable the optical designer to adapt the system to the respective imaging task. Fine-tuning can be carried out with respect to the image field, spectral range, resolution and geometric boundary conditions. The sequence of collective and dispersive parts in the individual groups and the choice of optical media are secondary.

A variable lens system with finite transmission length L is described, for example, in Boegehold, "Das optische System des Mikroskops [The Optical System of the Microscope]", Verlag Technik, Berlin 1958, pages 66ff. The system shown in this reference comprises, considered in the imaging direction, a lens of positive refractive power, a lens of negative refractive power and another lens of positive refractive power. The first and third lenses are fixedly coupled with one another and are displaced jointly. The second lens is arranged so as to be stationary. In order to fully cover the possible change in magnification from −0.3 to −3.0 in this system, a focus variation of 1.5 mm is indicated. The indicated joint, exclusively linear, movements of the lenses relate to optical compensation.

In addition, there are known systems which compensate mechanically for deviations in image sharpness. There are constructions in which the front or rear lens with positive refractive power is stationary and the remaining highly dynamic elements move relative to one another. A system with less dynamic mechanical compensation is described in DE 43 15 630 A1. In this case, a first lens group with positive refractive power, a second lens group with negative refractive power and a third lens group with positive refractive power are likewise used. The first lens group and third lens group are axially displaceable, but the third lens group carries out a nonlinear movement with respect to the first lens group. The resolution and control of the displacing movement of the components is also carried out via cams. The invention described in the following is associated with this latter type of variable lens system.

OBJECT AND SUMMARY OF THE INVENTION

It is the primary object of the invention to further develop a variable objective of the type described in the introduction in such a way that the focus variation is also kept small for large transmission lengths L and wide magnification ranges in a simplified construction.

According to the invention, it is provided that the first and third lens groups are displaceable jointly while maintaining the same relative distance L2, wherein the distance $L1+D1_{actual}$ measured between the first lens group and the object plane 0 changes by the amount $D1_{actual}=0 \ldots D1_{max}$, while the distance $D2_{actual}$ between the second lens group and the object plane 0 is subjected to a positively-guided nonlinear change.

In this connection, the movement of the second lens group can be described in a closed formula and can be initiated by simple driving means. This is carried out by the compulsory movement of the second lens group along the function curve of the cosine function depending on the movement of the first and third lens.

According to the invention, the parameters are indicated for the movement of the second lens group which is subject to the following relationship:

$$D2_{actual}=D2_{average}+C1*\cos(C2*D1_{actual}+C3),$$

where C1, C2 and C3 are command variables. A very good approximation of the exact mechanical compensation of the focus position is achieved in this way.

In various constructions, the principle of the variable objective according to the invention is carried out for transmission lengths in the range of 160 mm to 500 mm.

In this connection, the optical components and the respective maximum possible displacement distance $D1_{max}$ are indicated for transmission lengths L of 160 mm, 200 mm, 240 mm, 280 mm, 320 mm, 380 mm, 450 mm and 500 mm.

The link between the displacement distance $D1_{actual}$=... $D1_{max}$ and the change in distance $D2_{actual}$ is given when using the values indicated for each transmission length, $D2_{average}$, C1, C2 and C3, from the equation mentioned above. The adjusting values for the exact mechanical compensation deviate slightly from the analytically described values.

The displacing movements of the three lens groups can be triggered by different devices. For example, it is possible to control each of the three lens groups separately via stepper motors, wherein the adjusting speeds are to be predetermined such that the above-mentioned conditions are adhered to.

However, the use of cam gear units by which the relative movements between the first lens group and third lens group on the one hand and the second lens group on the other are positively controlled is also advantageous.

In this respect, it can be provided that the first lens group and third lens group are arranged in a fixed manner on a common holder which is displaceable in axial direction and by which the second lens group is coupled via a cam gear unit. The cam gear units are designed in such a way that a guide pin which is fixedly connected with the holder engages in a first control cam and a guide pin which is fixedly connected with the second lens group engages in a second control cam and the distances $D1_{actual}$ and $D2_{actual}$ can be changed depending on the angle of rotation of the control cams about the optical axis.

In alternate constructions, the control cams can be constructed in the wall of a cam tube which is rotatable about the optical axis or at the outer circumference of a cam drum which is rotatable about the optical axis.

A relatively simple mechanical construction can be achieved in that the holder is constructed as a sleeve in which the first lens group and second lens groups are received so as to be fixed with respect to rotation about the optical axis and the outer wall of the sleeve slides in the inner surface of a cam tube in an exact fit.

When the cam tube rotates about the optical axis, the guide pins engaging in the control cams are carried along in axial direction and the movement of the guide pins is transmitted to the first lens group and third lens group and to the second lens group as a displacing movement. The deviation of the displacing movement $D1_{actual}$ of the first lens group and third lens group from the displacement distance $D2_{actual}$ of the second lens group is predetermined by the cam shape and by the inclination of the control cams relative to the circumferential direction of rotation.

The rotational movement of the cam tube or cam drum can be triggered manually or by an electromechanical drive. On the other hand, as possible alternatives, the displacing drive can be constructed in that the holder is provided with a toothed rack in which a pinion engages, the second lens group communicates with an eccentric cam via a sensing lever, and the pinion and eccentric cam are arranged on a common shaft.

As the shaft rotates, the rotational movement of the pinion is transmitted to the toothed rack and is transformed into a longitudinal movement of the first lens group and third lens group. At the same time, the rotation of the shaft is transformed into a displacing movement of the second lens group via a sensing lever, wherein the displacing distance is predetermined by the shape of the eccentric cam.

In another advantageous construction, a cam surface which is oriented substantially parallel to the optical axis and whose contour is sensed by an angle lever which communicates with the second lens group can be provided at the holder. In an axial displacement of the holder or cam, the angle lever is deflected depending on the cam shape and transmits this movement to the second lens group.

The invention will be explained more fully in the following with reference to an embodiment example.

DESCRIPTION OF THE PREFERRED EMBODIMENTS

Figure 1:
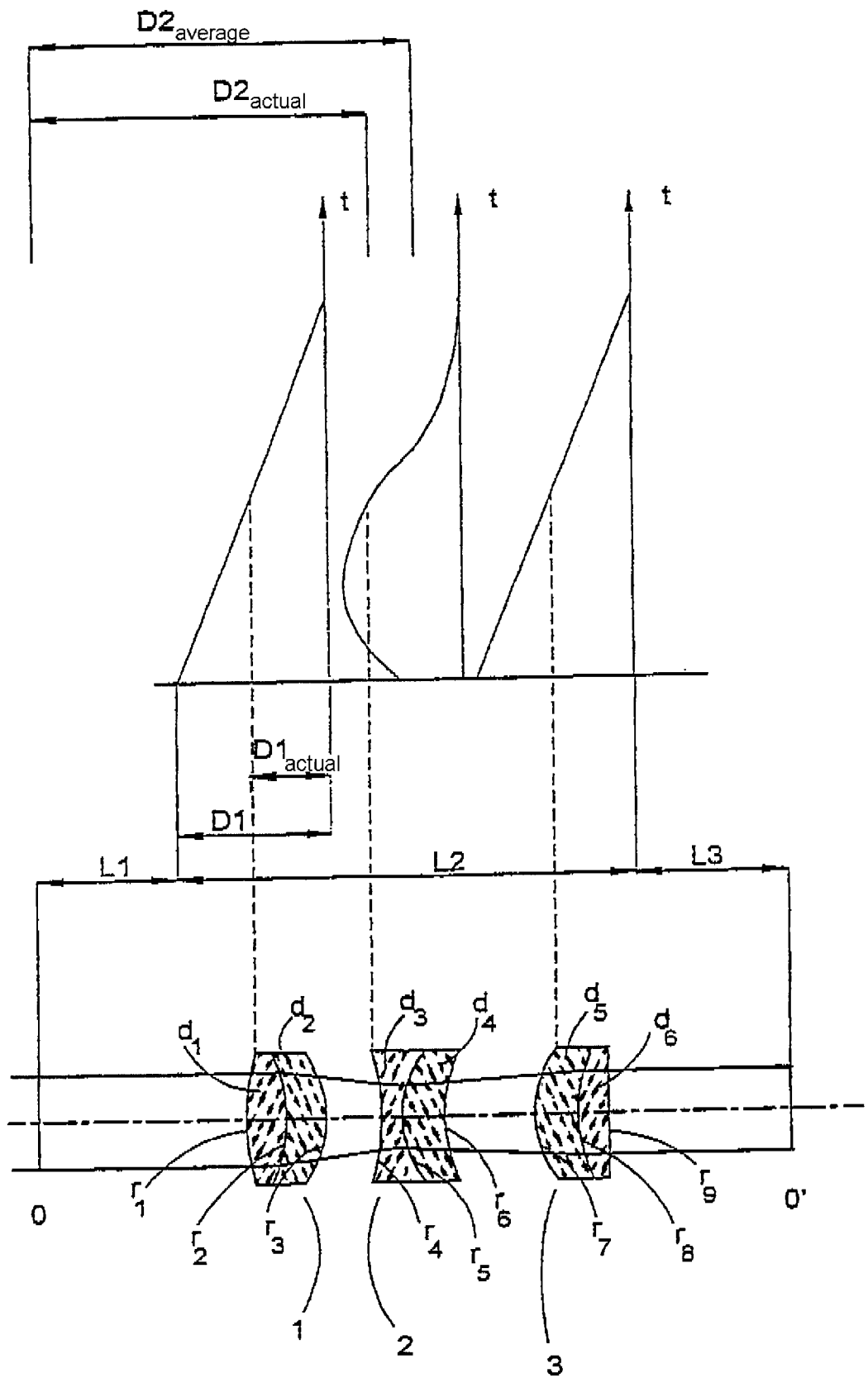
FIG. 1 shows a schematic view of the change in distance depending on time.

FIG. 1 shows the distances L1, L2 and L3 of the lens groups 1, 2 and 3 relative to one another and their distances from the object plane 0 and image plane 0'. Further, the displacement distance $D1_{max}$ of lens group 1 and lens group 2 as a function of time and the displacement of the lens group 2 which is nonlinear with respect to it are shown.

The relationship between $D1_{actual}$ and $D2_{actual}$ is given by the following equation:

$$D2_{actual}=D2_{average}+C1*\cos(C2*D1_{actual}+C3).$$

With a transmission length of L=L1+L2+L3 equals 160 mm, for example, the following conditions apply to lens groups 1, 2 and 3:

| Lens group | Thicknesses | Radii | Glass type | Focal length |
| --- | --- | --- | --- | --- |
| 1 | d1 = 3.50 | r1 = 39.63 | N-SSK8 | 21.69 |
|   | d2 = 1.50 | r2 = −7.76 | N-SF6 |   |
|   |   | r3 = −14.55 |   |   |
| 2 | d3 = 2.00 | r4 = −11.56 | N-FK5 | −11.60 |
|   | d4 = 3.00 | r5 = 4.40 | N-BASF2 |   |
|   |   | r6 = 8.11 |   |   |
| 3 | d5 = 1.50 | r7 = 11.56 | N-BASF2 | 22.90 |
|   | d6 = 3.50 | r8 = 3.21 | N-SSK8 |   |
|   |   | r9 = U |   |   | with the following distances:

L1=47.35; L2=42.39; L3=60.26; $D1_{max}$=19.47; $D2_{average}$=74.933; C1=6.32; C2=4.211 and C3=82.

Figure 2:
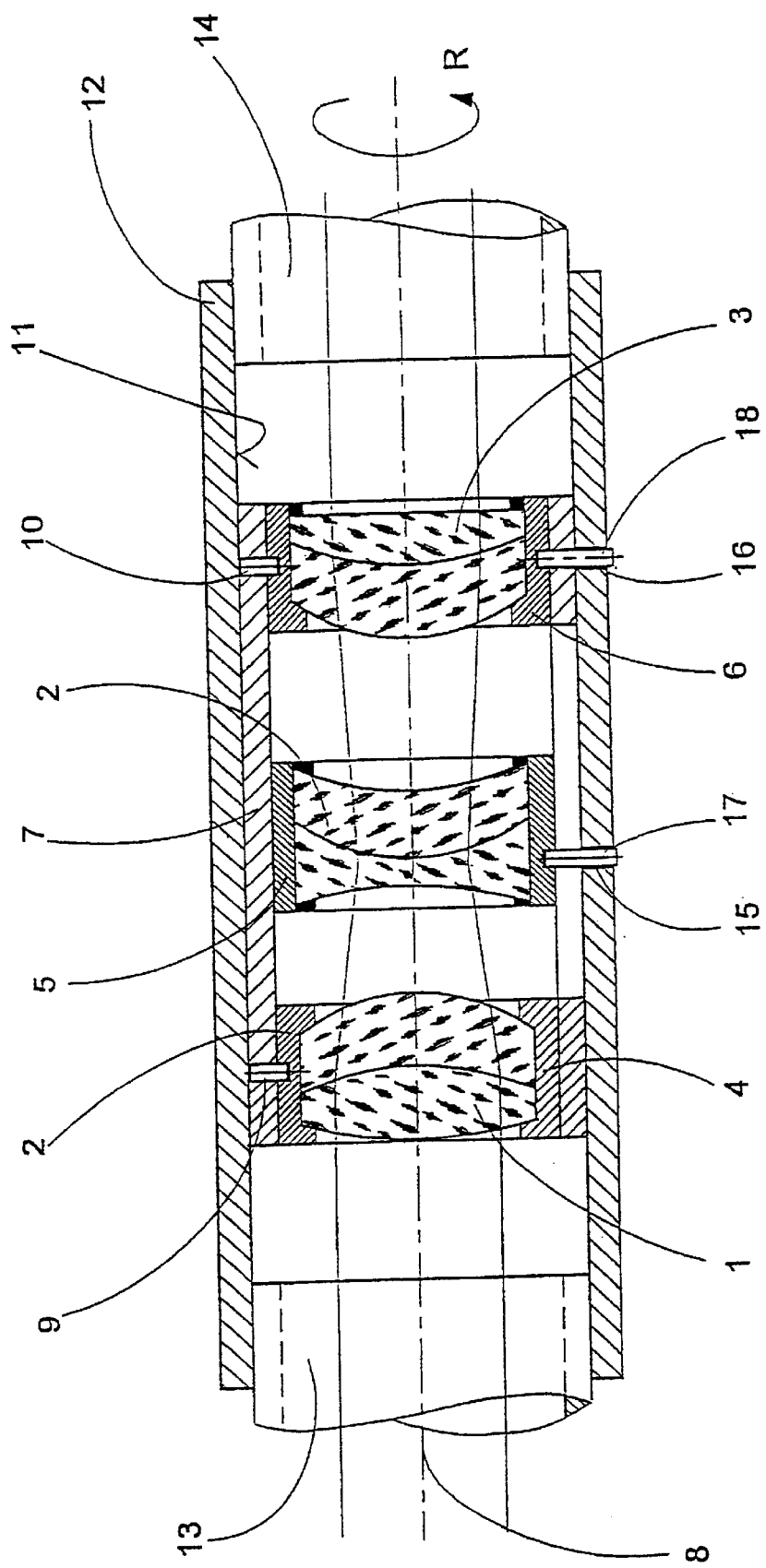
FIG. 2 shows a schematic view of the movement control with a cam tube.

An embodiment form of the variable objective according to the invention is shown schematically in FIG. 2. Each of the lens groups 1, 2, 3 is enclosed by a barrel or mounting 4, 5, 6 which is provided, for example, with cylindrical outer surfaces of identical diameter and received in a common sleeve 7. The sleeve 7 is also shown in a section through the optical axis 8 as are the rest of the subassemblies that are shown.

The positions of the lens groups 1 and 2 within the sleeve 7 are fixed by pins 9 and 10. On the other hand, lens group 2 is displaceable in the sleeve 7 in a sliding manner in the direction of the optical axis 8, so that its distance from the lens groups 1, 2 can change. All three lens groups 1, 2, 3 and the sleeve 7 are fixed (not shown) with respect to rotation about the optical axis 8.

The sleeve 7 is supported so as to slide with its outer surface along the inner wall 11 of a cam tube 12 and is accordingly displaceable in a straight line in the direction of the optical axis 8. The displacing movement of the sleeve 7 is transmitted to the lens groups 1, 3 via the pins 9, 10. The cam tube 12 is rotatable about the optical axis 8 in direction R and also in the opposite direction to direction R on frame-fixed bearings 13 and 14.

Control cams formed as guide slots 15, 16 are incorporated in the jacket of the cam tube 12, guide pins 17, 18 engaging in these guide slots 15, 16. Guide pin 17 is fixedly connected with lens group 2 and guide pin 18 is fixedly connected with lens groups 1, 3 via the sleeve 7.

If the magnification of the variable objective is to be changed, a change in the distance between the lens groups 1, 3 and the object plane 0 and image plane 0' is caused by rotating the cam tube 12 about the optical axis 8. Due to the preferably continuous inclination of the guide slot 16 relative to the rotational direction, the rotational movement of the cam tube 12 is transmitted linearly to the lens groups 1, 3 via the guide pin 18 resulting in the desired change in distance $D1_{actual}=0 \ldots D1_{max}$.

The rotational movement of the cam tube 12 is simultaneously transmitted via the guide pin 17 to lens group 2. However, the guide slot 15 is not (like guide slot 16) inclined continuously toward the rotating direction, but rather in such a way that the desired change in distance $D2_{actual}$ results according to the function indicated above depending on the angle of rotation.

Accordingly, in contrast to the change in distance $D1_{actual}$, the change in distance $D2_{actual}$ is carried out nonlinearly relative to the angle of rotation, wherein the lens group 2 is positively guided into a position in which the change in the focus position occurring when the magnification is changed is compensated and the image remains sharply imaged without changing.

Figure 3:
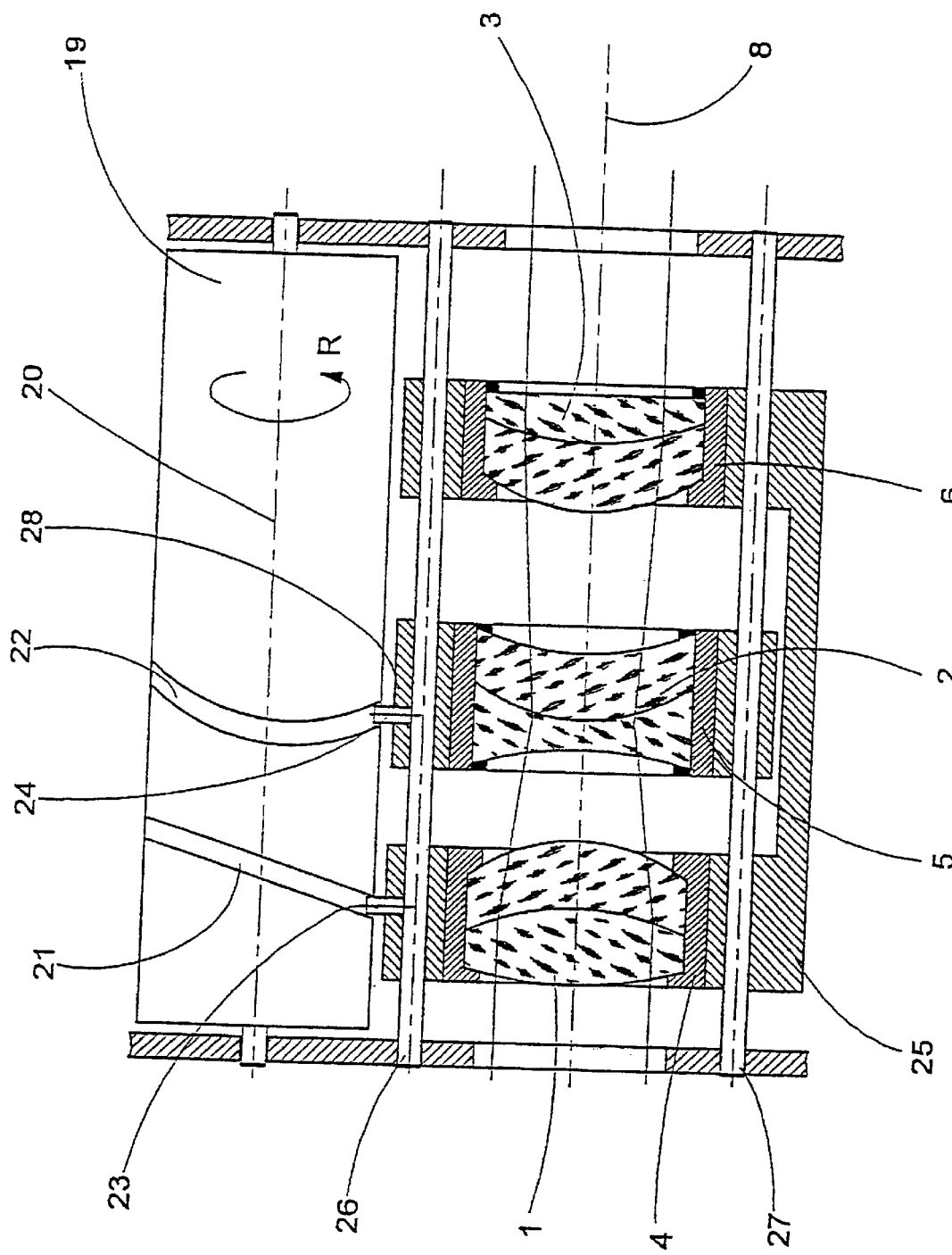
FIG. 3 shows a schematic view of the movement control with a cam drum.

FIG. 3 shows an embodiment form of the invention in which a cam drum 19 is provided instead of a cam tube. This cam drum 19 is supported so as to be rotatable about an axis of rotation 20 oriented to the optical axis 8. At its outer circumference, the cam drum 19 has two control cams which are formed as guide slots 21, 22 and in which guide pins 23, 24 engage.

The lens groups 1, 3 are received by their mountings 4, 6 in a carriage or slide 25 which is supported so as to slide on two frame-fixed straight-line guides 26, 27. In this instance, as in the above-described constructional variants of the invention, the lens groups 1, 3 are also fixed with respect to distance relative to one another and are prevented from rotating about the optical axis 8.

The lens group 2 is received by its mounting 5 in a slide 28 which is likewise supported so as to slide on the straight-line guides 26, 27 and is prevented from rotating about the optical axis 8.

When the cam drum 19 is rotated in direction R, the guide pin 23 engaging in the guide slot 21 causes the change in distance $D1_{actual}=0 \ldots D1_{max}$, while the guide pin 24 engaging in the guide slot 22 provides for the change in distance $D2_{actual}$.

In FIG. 3 shows the different inclinations of the guide slots 21, 22 to the rotating direction. The control cams can be shaped with respect to one another in such a way that the movement of lens groups 1, 3 on the one hand and of lens group 2 on the other hand are carried out at the same speed in the same movement direction or, at least in some portions, in opposite directions. The displacing distances $D1_{actual}$ and $D2_{actual}$ are always predetermined by the inclinations of the associated control cams to the rotating direction.

While the foregoing description and drawings represent the present invention, it will be obvious to those skilled in the art that various changes may be made therein without departing from the true spirit and scope of the present invention.

| Reference Numbers | |
|---|---|
| 1, 2, 3 | lens groups |
| 4, 5, 6 | mountings |
| 7 | sleeve |
| 8 | optical axis |
| 9, 10 | pins |
| 11 | inner wall |
| 12 | cam tube |
| 13, 14 | bearings |
| 15, 16 | guide slots |
| 17, 18 | guide pins |
| 19 | cam drum |
| 20 | axis of rotation |
| 21, 22 | guide slots |
| 23, 24 | guide pins |
| 25 | slide |
| 26, 27 | straight-line guides |
| 28 | slide |
| R | rotating direction |

What is claimed is:

1. A variable objective with finite transmission length L from the object plane 0 to the image plane 0', comprising:

three axially displaceable lens groups, wherein, successively in the imaging direction, a first lens group has positive refractive power, a second lens group has negative refractive power and a third lens group has positive refractive power;

said first lens group and third lens group, for purposes of changing magnification, being displaceable jointly while maintaining the same relative distance L2, wherein the distance $L1+D1_{actual}$ measured between the first lens group and the object plane 0 changes by the amount $D1_{actual}=0 \ldots D1_{max}$, while the distance $D2_{actual}$ between the second lens group and the object plane 0 is reserved for the adjustment of the image sharpness with the position of the first lens group and third lens group being held constant.

2. The variable objective according to claim 1, wherein the first lens group and third lens group are displaceable jointly while maintaining the same relative distance L2, wherein the distance $L1+D1_{actual}$ measured between the first lens group and the object plane 0 changes by the amount $D1_{actual}=0 \ldots D1_{max}$, while the distance $D2_{actual}$ between the second lens group (2) and the object plane 0 is subjected to a positively-guided nonlinear change.

3. The variable objective according to claim 2, wherein the positively guided nonlinear change is based on the following relationship:

$$D2_{actual}=D2_{average}+C1*\cos(C2*D1_{actual}+C3),$$

where C1, C2 and C3 are command variables characterizing the nonlinearity.

4. The variable objective according to claim 2, wherein the first lens group and third lens group are fixedly arranged on a common, axially displaceable holder and are coupled with the second lens group via a cam gear unit, wherein a guide pin which is fixedly connected with the holder engages in a first guide cam and a guide pin which is fixedly connected with the lens group engages in a second guide cam and the distances $D1_{actual}$ and $D2_{actual}$ can be changed depending on the rotation of the guide cams about the optical axis and on the inclinations of the guide cams relative to the rotating direction R.

5. The variable objective according to claim 4, wherein the guide cams are constructed in the wall of a cam tube which is rotatable about the optical axis.

6. The variable objective according to claim 4, wherein the guide cams are constructed at the outer circumference of a rotatable cam drum.

7. The variable objective according to claim 1, having a transmission length L=L1+L2+L3 of 160 mm with the following conditions for the first, second and third lens groups (1, 2, 3):

| Lens group | Thicknesses | Radii | Glass type | Focal length |
|---|---|---|---|---|
| 1 | d1 = 3.50 | r1 = 39.63 | N-SSK8 | 21.69 |
|   | d2 = 1.50 | r2 = −7.76 | N-SF6 |  |
|   |  | r3 = −14.55 |  |  |
| 2 | d3 = 2.00 | r4 = −11.56 | N-FK5 | −11.60 |
|   | d4 = 3.00 | r5 = 4.40 | N-BASF2 |  |
|   |  | r6 = 8.11 |  |  |
| 3 | d5 = 1.50 | r7 = 11.56 | N-BASF2 | 22.90 |
|   | d6 = 3.50 | r8 = 3.21 | N-SSK8 |  |
|   |  | r9 = U |  |  | and the following distances:

L1=47.35; L2=42.39; L3=60.26; $D1_{max}$=19.47; $D2_{average}$=74.933; C1=6.32; C2=4.211 and C3=82.

8. The variable objective according to claim 1, having a transmission length L=L1+L2+L3 of 200 mm with the following conditions for the first, second and third lens groups (1, 2, 3):

| Lens group | Thicknesses | Radii | Glass type | Focal length |
|---|---|---|---|---|
| 1 | d1 = 3.50 | r1 = 41.85 | N-SSK8 | 28.18 |
|   | d2 = 1.50 | r2 = 10.34 | N-SF6 |  |
|   |  | r3 = 20.42 |  |  |
| 2 | d3 = 2.00 | r4 = −17.57 | N-FK5 | −17.21 |
|   | d4 = 3.00 | r5 = 6.33 | N-BASF2 |  |
|   |  | r6 = 11.59 |  |  |
| 3 | d5 = 1.50 | r7 = −16.84 | N-BASF2 | 32.74 |
|   | d6 = 3.50 | r8 = 5.06 | N-SSK8 |  |
|   |  | r9 = U |  |  | and the following distances:

L1=57.92; L2=49.00; L3=83.08; $D1_{max}$=20.12; $D2_{average}$=85.970; C2=8.56 and C3=36.4.

9. The variable objective according to claim 1, having a transmission length L=L1+L2+L3 of 240 mm with the following conditions for the first, second and third lens groups (1, 2, 3):

| Lens group | Thicknesses | Radii | Glass type | Focal length |
|---|---|---|---|---|
| 1 | d1 = 3.50 | r1 = 42.76 | N-SSK8 | 34.32 |
|   | d2 = 1.50 | r2 = −13.31 | N-SF6 |  |
|   |  | r3 = −27.51 |  |  |
| 2 | d3 = 2.00 | r4 = −23.10 | N-FK5 | −21.75 |
|   | d4 = 3.00 | r5 = 7.84 | N-BASF2 |  |
|   |  | r6 = 14.16 |  |  |
| 3 | d5 = 1.50 | r7 = 21.43 | N-BASF2 | 40.66 |
|   | d6 = 3.50 | r8 = 7.07 | N-SSK8 |  |
|   |  | r9 = U |  |  | and the following distances:

L1=70.24; L2=57.54; L3=102.22; $D1_{max}$=23.97; $D2_{average}$=102.27; C1=0.95; C2=9.97 and C3=10.

10. The variable objective according to claim 1, having a transmission length L=L1+L2+L3 of 280 mm with the following conditions for the first, second and third lens groups (1, 2, 3):

| Lens group | Thicknesses | Radii | Glass type | Focal length |
|---|---|---|---|---|
| 1 | d1 = 3.50 | r1 = 45.91 | N-SSK8 | 40.31 |
|   | d2 = 1.50 | r2 = −16.17 | N-SF6 |  |
|   |  | r3 = −34.52 |  |  |
| 2 | d3 = 2.00 | r4 = −27.71 | N-FK5 | −25.85 |
|   | d4 = 3.00 | r5 = 9.17 | N-BASF2 |  |
|   |  | r6 = 16.59 |  |  |
| 3 | d5 = 1.50 | r7 = 25.45 | N-BASF2 | 47.95 |
|   | d6 = 3.50 | r8 = 8.67 | N-SSK8 |  |
|   |  | r9 = U |  |  | and the following distances:

L1=82.79; L2=66.36; L3=120.85; $D1_{max}$=28.03; $D2_{average}$=119.434; C1=0.96; C2=9.17 and C3=−5.3.

11. The variable objective according to claim 1, having a transmission length L=L1+L2+L3 of 320 mm with the following conditions for the first, second and third lens groups (1, 2, 3):

| Lens group | Thicknesses | Radii | Glass type | Focal length |
|---|---|---|---|---|
| 1 | d1 = 3.50 | r1 = 50.94 | N-SSK8 | 47.15 |
|   | d2 = 1.50 | r2 = −19.46 | N-SF6 |  |
|   |  | r3 = −42.38 |  |  |
| 2 | d3 = 2.00 | r4 = −31.51 | N-FK5 | −28.92 |
|   | d4 = 3.00 | r5 = 10.09 | N-BASF2 |  |
|   |  | r6 = 18.24 |  |  |
| 3 | d5 = 1.50 | r7 = 28.37 | N-BASF2 | 53.53 |
|   | d6 = 3.50 | r8 = 9.63 | N-SSK8 |  |
|   |  | r9 = U |  |  | and the following distances:

L1=97.35; L2=78.13; L3=134.52; $D1_{max}$=31.89; $D2_{average}$=142.006; C1=1.08; C2=7.82 and C3=1.9.

12. The variable objective according to claim 1, having a transmission length L=L1+L2+L3 of 380 mm with the following conditions for the first, second and third lens groups (1, 2, 3):

| Lens group | Thicknesses | Radii | Glass type | Focal length |
|---|---|---|---|---|
| 1 | d1 = 3.50 | r1 = 62.65 | N-SSK8 | 50.27 |
|   | d2 = 1.50 | r2 = −19.95 | N-SF6 |  |
|   |  | r3 = −40.97 |  |  |
| 2 | d3 = 2.00 | r4 = −29.64 | N-FK5 | −31.69 |
|   | d4 = 3.00 | r5 = 11.22 | N-BASF2 |  |
|   |  | r6 = 21.76 |  |  |
| 3 | d5 = 1.50 | r7 = 35.23 | N-BASF2 | 66.78 |
|   | d6 = 3.50 | r8 = 11.80 | N-SSK8 |  |
|   |  | r9 = U |  |  | and the following distances:

L1=103.00; L2=96.97; L3=170.03; $D1_{max}$=36.00; $D2_{average}$=150.472; C1=1.49; C2=6.48 and C3=11.4.

13. The variable objective according to claim 1, having a transmission length L=L1+L2+L3 of 450 mm with the following conditions for the first, second an third lens groups (1,2,3):

| Lens group | Thicknesses | Radii | Glass type | Focal length |
|---|---|---|---|---|
| 1 | d1 = 3.50<br>d2 = 1.50 | r1 = 57.73<br>r2 = −20.42<br>r3 = −43.03 | N-SSK8<br>N-SF6 | 50.02 |
| 2 | d3 = 2.00<br>d4 = 3.00 | r4 = −31.89<br>r5 = 11.55<br>r6 = 21.68 | N-FK5<br>N-BASF2 | −32.34 |
| 3 | d5 = 1.50<br>d6 = 3.50 | r7 = 43.63<br>r8 = 14.66<br>r9 = U | N-BASF2<br>N-SSK8 | 82.71 | and the following distances:

L1=102.98; L2=119.71; L3=217.31; $D1_{max}$=39.27;

$D2_{average}$=149.889; C1=2.64; C2=4.79 and C3=32.

14. The variable objective according to claim 1, having a transmission length L=L1+L2+L3 of 500 mm with the following conditions for the first, second and third lens groups (1, 2, 3):

| Lens group | Thicknesses | Radii | Glass type | Focal length |
|---|---|---|---|---|
| 1 | d1 = 3.50<br>d2 = 1.50 | r1 = 59.05<br>r2 = −20.39<br>r3 = −42.99 | N-SSK8<br>N-SF6 | 50.51 |
| 2 | d3 = 2.00<br>d4 = 3.00 | r4 = −30.94<br>r5 = 11.24<br>r6 = 21.27 | N-FK5<br>N-BASF2 | −31.69 |
| 3 | d5 = 1.50<br>d6 = 3.50 | r7 = 47.85<br>r8 = 16.23<br>r9 = U | N-BASF2<br>N-SSK8 | 90.51 | and the following distances:

L1=107.22; L2=134.52; L3=248.26; $D1_{max}$=43.23;

$D2_{average}$=157.615; C1=5.74; C2=3.09 and C3=54.6.

15. The variable objective according to claim 1, wherein the first, second and third lens groups (1, 2, 3) are coupled with separately controllable adjusting drives, preferably with stepper motors.

16. The variable objective according to claim 1, wherein the transmission length L=L1+L2+L3 satisfies the condition that $50 \leq L \leq 1000$.

17. The variable objective according to claim 1, wherein the magnification ratio V=β'/β" satisfies the condition that $2 \leq V \leq 6$, where β' is the magnification in the end position $D1_{actual}=D1_{max}$ and β" is the magnification in the end position $D1_{actual}=0$.

18. The variable objective according to claim 1, wherein the object plane and the image plane are exchanged.

\* \* \* \* \*